United States Patent [19]
Chio

[11] Patent Number: 4,606,725
[45] Date of Patent: Aug. 19, 1986

[54] LOGIC TRAINING BOARD ASSEMBLY

[76] Inventor: Chuy-Nan Chio, F 9-3, No. 333, Fu Hsing North Road, Taipei, Taiwan

[21] Appl. No.: 790,465

[22] Filed: Oct. 23, 1985

[51] Int. Cl.$^4$ .............................................. G09B 23/18
[52] U.S. Cl. .................................................... 434/224
[58] Field of Search ........................ 434/224, 430, 189

[56] References Cited

U.S. PATENT DOCUMENTS

| | | | |
|---|---|---|---|
| D. 235,554 | 6/1975 | Portugal | D13/30 |
| 2,390,706 | 12/1945 | Hearon | 434/224 |
| 3,464,123 | 9/1969 | Hurtig | 434/189 |
| 3,514,872 | 6/1970 | Bradley | 434/224 |
| 3,766,668 | 10/1973 | Vogel | 434/430 |
| 4,146,976 | 4/1979 | Zambiasi | 434/430 |
| 4,455,749 | 6/1984 | Hayward | 434/224 X |

Primary Examiner—William H. Grieb
Attorney, Agent, or Firm—Darby & Darby

[57] ABSTRACT

The present invention relates to a logic training board assembly which includes a plurality of power distribution strips and a plurality of element terminal plates each of which can be connected into an assembly according to the user's need by a plurality of dovetail protrusions and dovetail recesses and each of the strips and plates providing a plurality of circular terminal slots which are arranged at a precise distance from each other for convenience in inserting DIP IC pins or other electronic elements even across the connecting portion of two adjacent plates, economizing space and allowing more electronic elements to be set on the surface of the board assembly in practical use.

3 Claims, 11 Drawing Figures

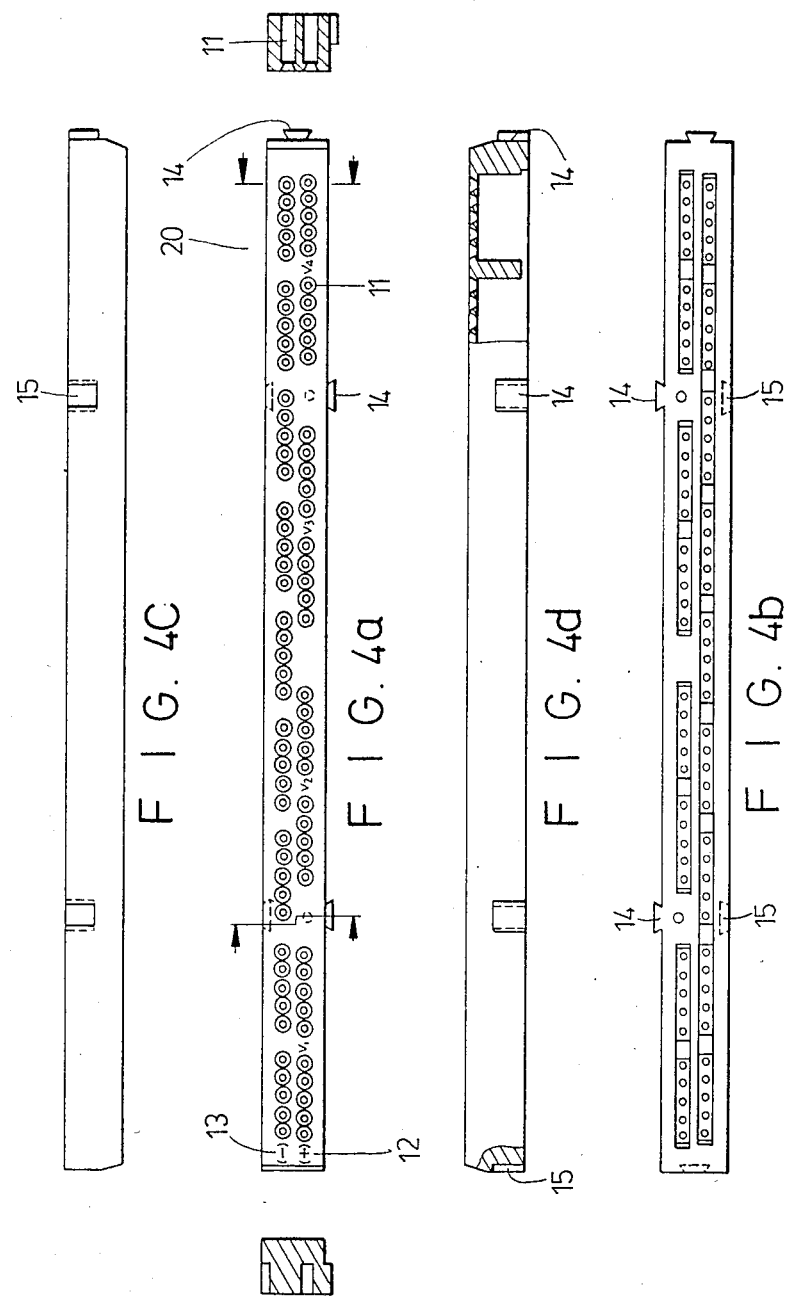

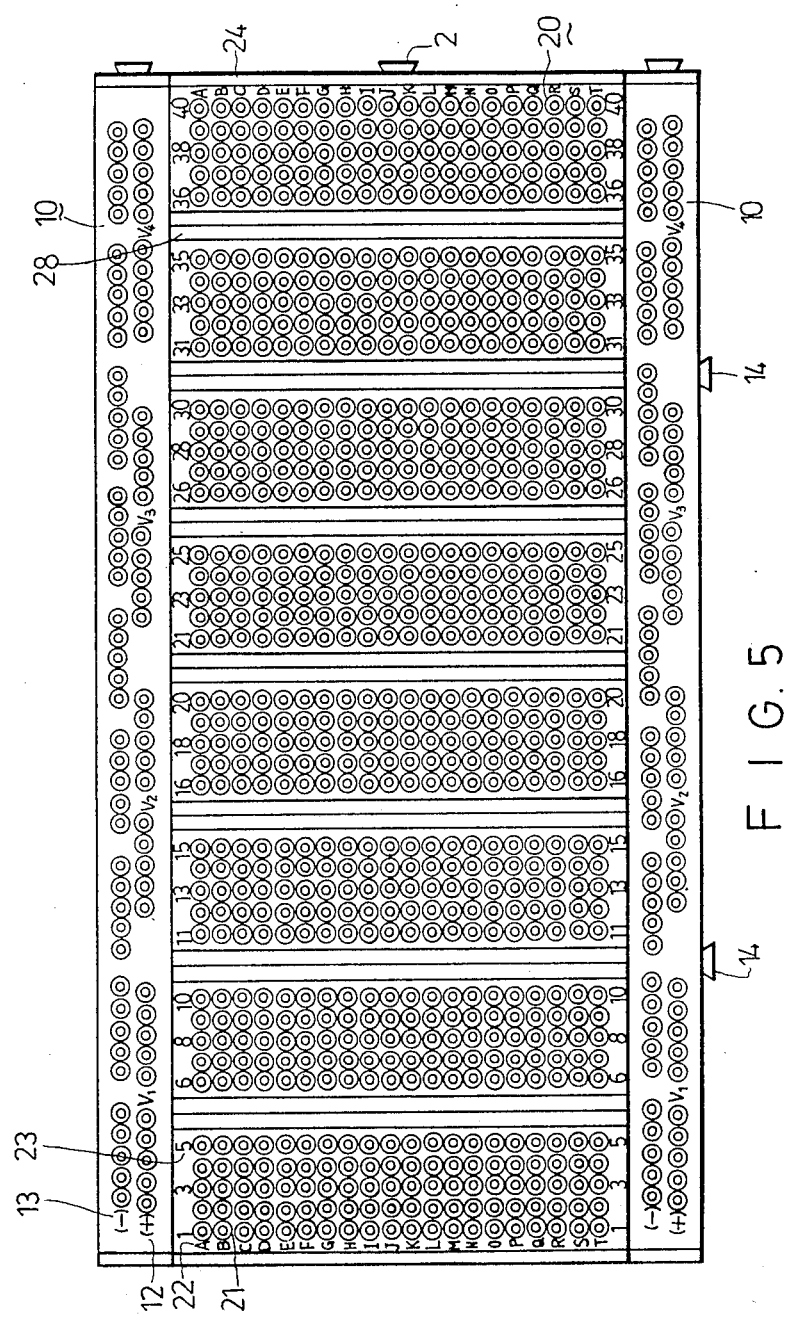

LOGIC TRAINING BOARD ASSEMBLY

BACKGROUND OF THE INVENTION

The present invention relates to a logic training board assembly, particularly concerning an improved breadboard, each element of which can be connected as an assembly according the user's needs by a plurality of dovetail protrusions and recesses and each board of which providing a plurality of circular terminal slots which are convenient for inserting DIP IC pins or other electronic elements even across the connecting portion of each board to save space in practical use.

Many of the known designs of breadboard used today for electronic circuit designers or for students use in electronic lab for logic training purposes, are designed with an arrangement such that each breadboard unit provides a plurality of square shaped terminal slots and a plurality of rounded protrusions and recesses for being connected into an assembly.

Rounded protrusions and recesses used for connecting each unit have the disadvantage that they detach easily from each other if a long series of units is connected to form an assembly. This inconveniences the users in practical use.

In addition, according to medical reports, the plurality of square shaped terminal slots can easily tire the user's eyes and harms the eyesight if he looks at them for a long period of time during his design work with the breadboard.

In the connecting portion of two breadboards, the distance from the terminal slots located along the border of one breadboard to the terminal slots of another, adjacent breadboard is such it is impossible to insert DIP IC pins across it, wasting space in the breadboard assembly.

SUMMARY OF THE INVENTION

With the above disadvantages in mind, the general object of the invention is to provide a logic training board assembly which is simple in construction and which will overcome the deficiencies and disadvantages of the prior arrangement.

An object of the invention is to provide a simple and practical logic training board which is capable of connecting each board by a plurality of dovetail protrusions and recesses which better connect the boards, preventing them from becoming detached in practical use.

Another object of the invention is to provide a logic training board assembly which is capable of connecting each board in both longitudinal and lateral directions according to the user's need in his design work.

Still another object of the invention is to provide a logic training board assembly which provides a precise connecting arrangement of two adjacent boards in the lateral direction such that the DIP IC pins can be inserted into two border terminal slots of two adjacent boards across the connecting portion for saving space on the surface of the boards.

Still another object of the invention is to provide a logic training board assembly which provides a power distribution strip with a plus (+) and a minus (−) sign for indicating a positive and a negative terminal and a series of voltage indicating marks for convenience in electronic circuit design.

Still another object of the invention is to provide a logic training board assembly which provides a plurality of circular terminal slots that avoid tiring the user's eyes and are pleasing during the long period of time the user spends looking at the board assembly in practical use.

Still a further object of the invention is to provide an arrangement of concealed screw holes at the bottom side of the board adapted to be connceted to any supporting base with screws so that the screw heads do not protude from the side of the board surface and the board surface has a better appearance.

In order to achieve the aforesaid objects as well as other incidental objects and advantages, the invention includes a plurality of power distribution strips each of which has a plurality of first circular terminal slots, and a plurality of element terminal plates each of which has two parallel longer sides and a plurality of terminal slots arranged in intersecting rows. First grooves of V-shaped cross-section extend on the surface of the plates parallel with the shorter sides.

Each of the shorter sides of the plate has a bevel face adjacent to the top surface of the plate. The bevel face of one of the plates cooperates with the bevel face of the adjacent plate to define a second groove which is the same size and shape as the first groove.

The power distribution strips and the element terminal plates further include a plurality of dovetail protrusions and dovetail recesses provided at the sides for connecting the power distribution strips and the element terminal plates in a side by side relationship.

The terminal slots located along the border of the grooves formed by the connection of two plates are at the same distance from each other as, and located in the same rows as, the terminal slots located along the border of the grooves on the surface of the element terminal plate, which distance corresponds to the distance between opposite pins of DIP IC components, so that DIP IC and other electronic elements can be inserted into those terminal slots across the connecting portions of the boards. In practical use, this saves a great deal of space and allows more electronic units to be set on the surface of the board assembly.

Each power distribution strip further includes a plus (+) and a minus (−) signs for indicating a positive and a negative terminals and a series of voltage indicating marks on its surface for convenience in the user's design work.

The element terminal plates further include a series of label marks for each row and each column of the terminal slots to facilitate determining the electronic elements location on the board surface for convenience in design work.

The invention further includes a plurality of concealed threaded holes at the bottom side of the strips and the plates, for connecting the board assembly on any supporting base by a screw through the concealed threaded holes so that there are no screw heads protruding from the side of the board surface and the board surface has a better appearance.

BRIEF DESCRIPTION OF THE DRAWINGS

These and other advantages, objects and features of the present invention will become apparent from the following detailed description of the preferred embodiments with reference to the accompanying drawings, wherein:

FIG. 4a is a top view of the power distribution strip and two cross-sectional views of the inner construction takes along lines A—A' and B—B';

FIG. 4b is a bottom view of FIG. 4a showing the concealed threaded holes at the bottom of the power distribution strip;

FIG. 4c is a side view of FIG. 4a showing a plurality of dovetail recesses along its side surface;

FIG. 4d is another side view of FIG. 4a showing a plurality of dovetail protrusions along its side surface and a partial cross-sectional view thereof;

FIG. 5 is a preferred embodiment of the invention showing an element terminal plate connecting with two power distribution strips;

DETAILED DESCRIPTION OF THE PREFERRED EMBODIMENT

Figure 1:
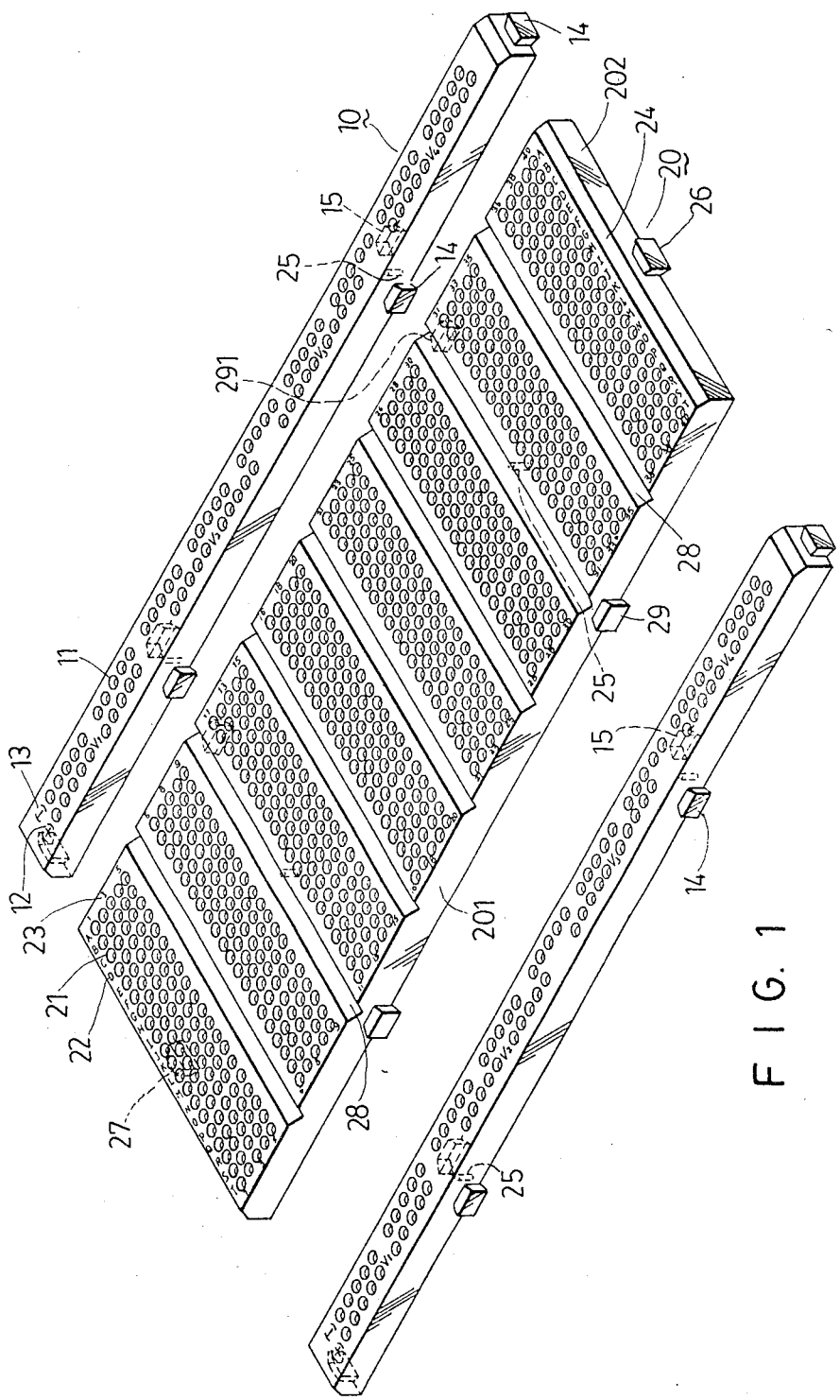
FIG. 1 is an exploded and perspective view of the invention.
Figure 2A:
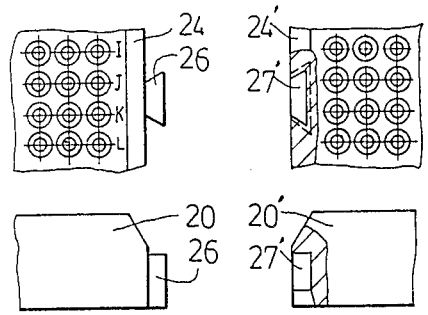
FIG. 2a is an enlarged fragmentary top and cross-sectional view of the dovetail protrusion and recess before connection according to the invention.
Figure 2B:
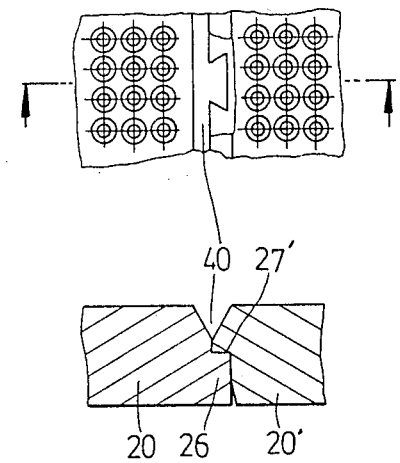
FIG. 2b is an enlarged fragmentary top and cross-sectional view of the dovetail protrusion and recess after connection, the bevel portions of two adjacent plates forming a groove in V-shape cross section.
Figure 3:
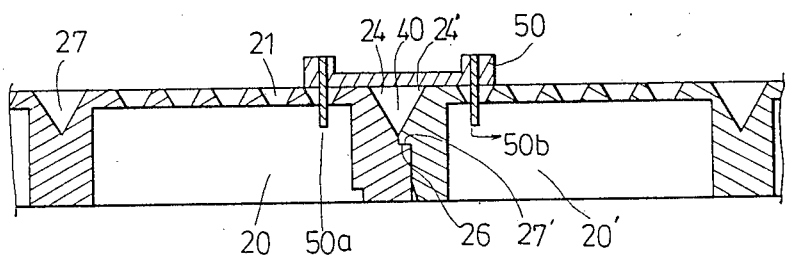
FIG. 3 is a cross-sectional view of two plates after connection into a unit, the connecting portion (the bevel portion of two adjacent plates) forming a V-shaped cross-sectional groove, showing that the DIP IC pins can be inserted into the terminal slots across the connecting portion according to the invention.

The following is a detailed description of the best presently contemplated embodiment of the invention. This description is not to be taken in a limiting sense, but is made merely for the purpose of illustrating the general principles of the invention.

Referring to FIG. 1, FIG. 2a, FIG. 2b, FIG. 3, FIG. 4a, FIG. 4b, FIG. 4c and FIG. 4d, the invention includes a plurality of power distrubution strips 10 each of which has a plurality of first circular terminal slots 11, and a plurality of dovetail protrusions 14 and dovetail recesses 15 at the sides. Each power distribution strip 10 further includes a plus (+) and a minus (−) sign 12, 13 and a plurality of voltage indicating marks 11a (V1, V2, V3 and V4 etc.,) on its surface for convenience in practical design work.

The invention further includes an element terminal plate 20 which has two parallel longer sides 201, two parallel shorter sides 202 and a plurality of circular terminal slots 21 arranged in intersecting rows. First grooves of V-shaped cross-section 28 extending on the surface of the element terminal plate 20 parallel with the shorter sides 202.

Figure 6:
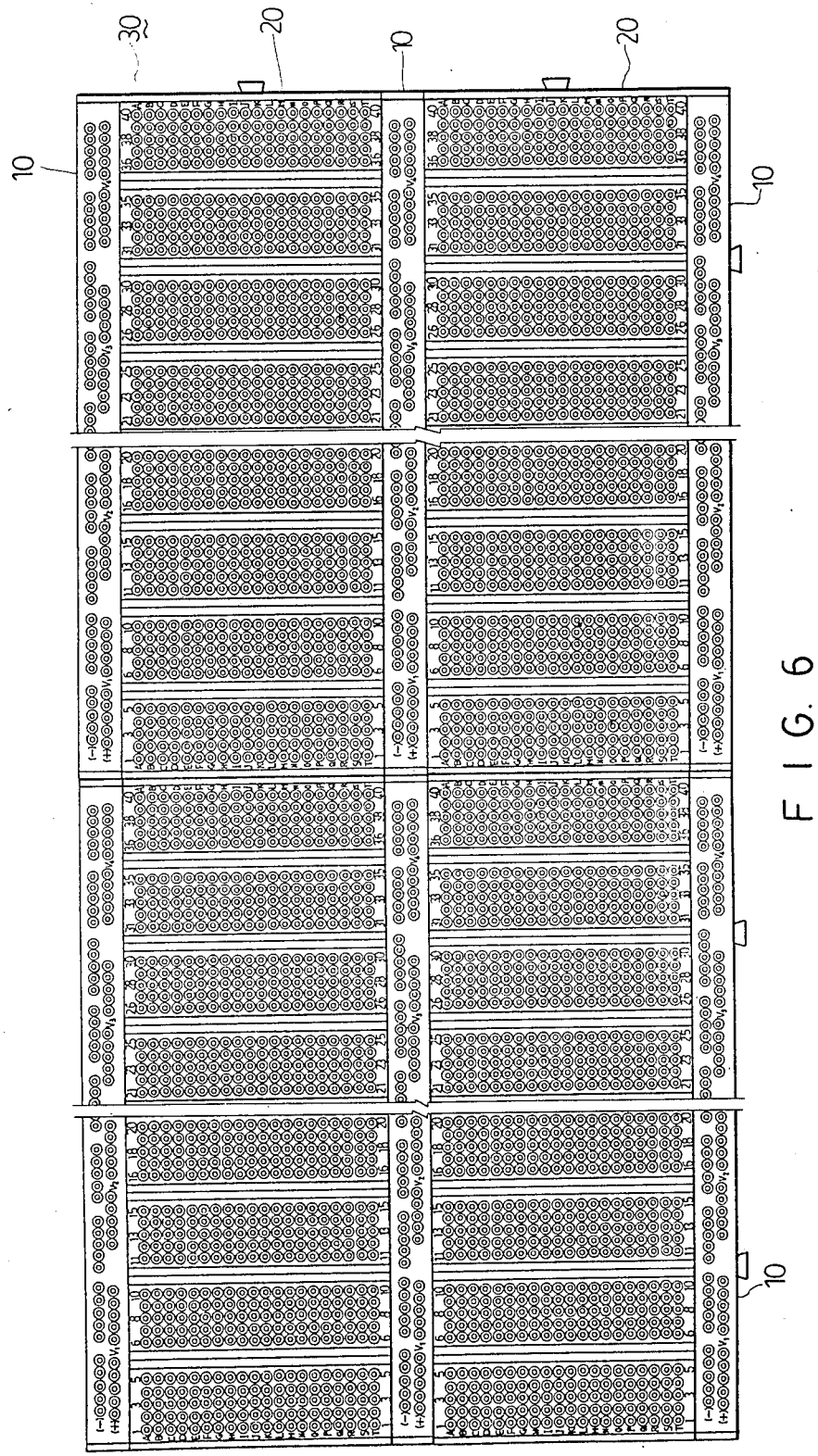
FIG. 6 is another preferred embodiment of the invention showing a plurality of element terminal plates and strips combinel into a board assembly.

The element terminal plate 20 further includes a plurality of dovetail protrusions 26 and dovetail recesses 27 provided at the shorter sides 202 and dovetail protrusions 29 and dovetail recesses 291 provided at the longer sides 201. The size of the dovetail protrusions 14, 26, 29 and the dovetail recesses 15, 27, 291 equal so that the power distribution strips and the element terminal plates can be connected in a side by side relationship by the protrusions 14, 29 and the recesses 15, 291 (see FIG. 5) and the element terminal plates 20 can be connected in lateral and longitudal direction by the protrusions 14, 26, 29 and the recesses 15, 27, 291 in a board assembly 30 (see FIG. 6).

Each of the shorter sides 202 of the element terminal plate 20 has a bevel face 24 adjacent to the top surface of the plate 20. The bevel face 24 of one plate cooperates with another adjacent bevel face 24' of an adjacent plate 20' to define a second groove 40 which is the same size and shape as the first groove 28 of the element terminal plate 20. The terminal slots 21 located along the border of the grooves 40 formed by the connection of two plates 20 are at the same distance from each other as, and located in the same rows as, the terminal slots located along the border of the grooves 28 on the surface of the element terminal plate 20, which distance corresponds to the distance between opposite pins 50a, 50b of DIP IC 50 components, so that DIP IC and other electronic elements can be inserted into those terminal slots 21 across the connecting portions of the boards (see FIG. 3). In practical use, this saves a great deal of space and allows more electronic units to be set on the surface of the board assembly.

The element terminal plate 20 further includes a series of label marks 23 (1–40) for indicating columns and marks 22 (A–T) for indicating rows, facilitating determination of the location of the electronic elements the board surface and conveniencing the use in design work.

Figure 7:
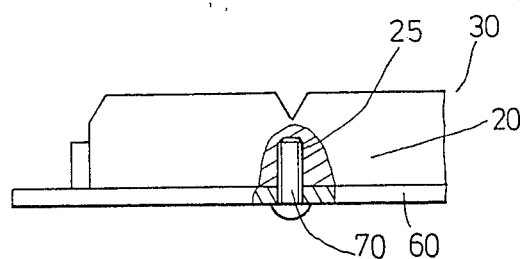
FIG. 7 is a fragmentary cross-sectional view of the concealed screw holes at the back of the element terminal plates or of the power distribution strips according to the invention.

Referring to FIG. 7, the invention further includes a plurality of concealed threaded holes 25 at the bottom side of the power distribution strips 10 and the element terminal plates 20 for connecting the board assembly 30 on any supporting base 60 by screws 70 through the concealed threaded holes 25 so that there are no screw heads protruding from the side of the board surface and a better appearance is created.

While this invention has been described with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

I claim:

1. A logic training board assembly, mountable on a base, for receiving in an orderly way electronic elements such as DIP IC's, comprising:

a plurality of power distribution strips each of which has a plurality of first circular terminal slots;

a plurality of element terminal plates each of which has two parallel longer sides and two parallel shorter sides and each of which has a plurality of second circular terminal slots arranged in intersecting rows, first grooves of V-shaped cross-section extending on the surface of said plates parallel with said shorter sides, each of said shorter sides having a bevel face adjacent to the top surface of said plate, said bevel face of one of said plates cooperating with said bevel face of another adjacent plate to define a second groove which is the same size and shape as said first grooves, wherein said terminal slots located along the border of said second grooves are at the same distance from each other as, and located in the same rows as, said terminal slots located along the border of said first grooves on the surface of said element terminal plates, which distance corresponds to the distance between opposite pins of said DIP IC;

means for connecting said strips and said plates in a side by side relationship, including dovetail protrusions and dovetail recesses provided at the sides of said strips and said plates; and means for mounting said strips and said plates on said base, including concealed threaded holes adapted for receiving a screw at the bottom side of said strips and said plates.

2. A logic training board assembly as claimed in claim 1, wherein said power distribution strips further comprise a plus (+) and a minus (−) sign on each of said strips, for indicating positive and negative voltage terminals, and a series of voltage indicating marks on the surface of said strips.

3. A logic training board assembly as claimed in claim 1, wherein said element terminal plates further include a series of label marks indicating columns and rows.

* * * * *